US012804427B2

(12) United States Patent
Xu et al.

(10) Patent No.: US 12,804,427 B2
(45) Date of Patent: Nov. 17, 2026

(54) NETWORK ISSUE TROUBLESHOOTING METHOD, DEVICE, AND SYSTEM

(71) Applicant: HUAWEI TECHNOLOGIES CO., LTD., Shenzhen (CN)

(72) Inventors: Ruiyue Xu, Shanghai (CN); Lan Zou, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 491 days.

(21) Appl. No.: 18/366,390

(22) Filed: Aug. 7, 2023

(65) Prior Publication Data

US 2023/0388824 A1 Nov. 30, 2023

Related U.S. Application Data

(63) Continuation of application No. PCT/CN2022/072381, filed on Jan. 17, 2022.

(30) Foreign Application Priority Data

Feb. 9, 2021 (CN) ........................ 202110181927.X

(51) Int. Cl.
*H04W 24/04* (2009.01)
*H04L 41/04* (2022.01)

(52) U.S. Cl.
CPC ............. *H04W 24/04* (2013.01); *H04L 41/04* (2013.01)

(58) Field of Classification Search
None
See application file for complete search history.

(56) References Cited

U.S. PATENT DOCUMENTS 7,028,228 B1 * 4/2006 Lovy ........................ H04L 43/10 714/57
2011/0228665 A1 * 9/2011 Kumar ................ H04L 41/0631 370/216

(Continued)

FOREIGN PATENT DOCUMENTS

CN 101257694 A 9/2008
CN 106452901 A 2/2017

(Continued)

OTHER PUBLICATIONS

3GPP TR 28.809 V1.1.0:“3rd Generation Partnership Project;Technical Specification Group Services and System Aspects;Management and orchestration; Study on enhancement of Management Data Analytics (MDA)(Release 17)”,Nov. 2020.total 93 pages.

(Continued)

*Primary Examiner* — Diane L Lo
(74) *Attorney, Agent, or Firm* — HAUPTMAN HAM, LLP

(57) ABSTRACT

This application discloses a network issue troubleshooting method, device, and system. According to the method, a first device determines first information, where the first information includes network issue information indicating a network issue to be troubleshot, and sends the first information to a second device. The second device troubleshoots the network issue to be troubleshot based on network issue information. The adoption of the method helps resolve a problem that the first device and the second device have different requirements for troubleshooting network issues. In conventional methods, the second device diagnoses and rectifies network issues. In some cases, the first device may not expect some network issues to be diagnosed or rectified, but the second device cannot obtain the intent of the first device before troubleshooting. In this application, the problem can be (Continued)

effectively resolved because the second device troubleshoots network issues according to an indication of the first device.

20 Claims, 7 Drawing Sheets

(56) References Cited

U.S. PATENT DOCUMENTS

2016/0330067 A1 11/2016 Liu et al.
2017/0366983 A1 * 12/2017 Gunasekara ........ H04L 43/0811

FOREIGN PATENT DOCUMENTS

CN 111181751 A 5/2020
WO 2021208979 A1 10/2021

OTHER PUBLICATIONS

International Search Report issued in corresponding International Application No. PCT/CN2022/072381, dated Apr. 6, 2022, pp. 1-9.

* cited by examiner

NETWORK ISSUE TROUBLESHOOTING METHOD, DEVICE, AND SYSTEM

CROSS-REFERENCE TO RELATED APPLICATIONS

This application is a continuation of International Application No. PCT/CN2022/072381, filed on Jan. 17, 2022, which claims priority to Chinese Patent Application No. 202110181927.X, filed on Feb. 9, 2021. The disclosures of the aforementioned applications are hereby incorporated by reference in their entireties.

TECHNICAL FIELD

This application relates to the field of network maintenance technologies, and in particular, to a network issue troubleshooting method, device, and system.

BACKGROUND

With the convergence of various industries, a quantity of terminal devices in a communication network increases sharply, a scope of services expands gradually, and the communication network becomes more complex, increasing complexity in network O&M. How to reduce network O&M costs and simplify the network O&M process is an urgent problem to be resolved in network O&M.

The adoption of automation technologies in mobile communication network has become the focus and research hotspot of the industry. The industry expects to introduce automation technologies (for example, artificial intelligence, machine learning, and big data analysis) to help resolve the current problems about O&M efficiency and capabilities of communication networks. The complexity and diversity of networks brings the diversity of network faults or issues. How to quickly troubleshoot issues becomes a key challenge for operators. Operators expect to introduce network automation or intelligent technologies to quickly troubleshoot issues, thereby reducing manual operations, lowering operating expenses (operating expenses, OPEXes) of operators, and improving O&M efficiency.

SUMMARY

Embodiments of this application provide a network issue troubleshooting method, device, and system, to resolve a problem that different devices have different specifications for troubleshooting a network issue.

According to a first aspect, an embodiment of this application provides a network issue troubleshooting method, including:

a first device determines first information, where the first information includes network issue information, and the network issue information indicates a network issue to be troubleshot by a second device; and the first device sends the first information to the second device.

In conventional methods, the second device diagnoses and rectifies network issues. In some cases, however, the first device may not expect some network issues to be diagnosed or rectified, but the second device cannot obtain the intent of the first device before troubleshooting the network issues. However, in embodiments of this application, the first device sends the first information to the second device, to indicate a network issue to be troubleshot by the second device. This helps resolve a problem that the first device and the second device have different specifications for troubleshooting network issue.

In a possible implementation, the first information further includes at least one of the following information:

diagnosis indication information, indicating diagnosis of the network issue to be troubleshot;

recovery indication information, indicating recovery of the network issue to be troubleshot; and query indication information, indicating query of the network issue to be troubleshot.

In a possible implementation, the first information further includes at least one of the following information:

a first duration, indicating that another rectification is not allowed within the first duration when the network issue to be troubleshot is rectified; and a second duration, indicating to verify, within the second duration, whether the network issue to be troubleshot is successfully rectified.

In a possible implementation, the network issue information includes at least one of the following information: a network issue identifier, a network issue scope, a network issue type, and a network issue name.

In a possible implementation, the network issue scope includes at least one of the following:

a network element, indicating that a network issue of the network element is a network issue to be troubleshot;

a cell, indicating that a network issue of the cell is a network issue to be troubleshot;

a geographic region, indicating that a network issue of the geographic region is a network issue to be troubleshot;

a tracking region, indicating that a network issue of the tracking region is a network issue to be troubleshot;

a network issue type, indicating that a network issue whose type is the network issue type is a network issue to be troubleshot; and a network issue name, indicating that a network issue whose name is the network issue name is a network issue to be troubleshot.

In a possible implementation, the method further includes:

The first device obtains second information, where the second information includes a network issue identifier and at least one of the following information: a network issue cause, a network issue recovery capability, a network issue recovery recommendation, and a predicted recovery result for the network issue.

That the first device determines first information includes:

the first device determines the first information based on the second information.

In a possible implementation, the method further includes:

the first device obtains network data.

That the first device determines first information includes:

the first device determines first information based on the obtained network data.

In a possible implementation, the method further includes:

the first device receives a network issue troubleshooting result.

In a possible implementation, the first information is network issue intent information.

According to a second aspect, an embodiment of this application provides a network issue troubleshooting method, including:

A second device receives first information sent by a first device, where the first information includes network issue information, and the network issue information indicates a network issue to be troubleshot; and the second device troubleshoots, based on the first information, the network issue to be troubleshot.

In a possible implementation, the first information further includes at least one of the following information:

diagnosis indication information, indicating diagnosis of the network issue to be troubleshot;

recovery indication information, indicating recovery of the network issue to be troubleshot; and query indication information, indicating query of the network issue to be troubleshot.

In a possible implementation, the first information further includes at least one of the following information:

a first duration, indicating that another rectification is not allowed within the first duration when the network issue to be troubleshot is rectified; and a second duration, indicating to verify, within the second duration, whether the network issue to be troubleshot is successfully rectified.

In a possible implementation, the network issue information includes at least one of the following information: a network issue identifier, a network issue scope, a network issue type, and a network issue name.

In a possible implementation, the network issue scope includes at least one of the following:

a network element, indicating that a network issue of the network element is a network issue to be troubleshot;

a cell, indicating that a network issue of the cell is a network issue to be troubleshot;

a geographic region, indicating that a network issue of the geographic region is a network issue to be troubleshot;

a tracking region, indicating that a network issue of the tracking region is a network issue to be troubleshot;

a network issue type, indicating that a network issue whose type is the network issue type is a network issue to be troubleshot; and a network issue name, indicating that a network issue whose name is the network issue name is a network issue to be troubleshot.

In a possible implementation, before the receiving, by a second device, first information sent by a first device, the method further includes:

the second network device sends second information to the first network device, so that the first network device determines the first information based on the second information.

The second information includes a network issue identifier and at least one of the following information: a network issue cause, a network issue recovery capability, a network issue recovery recommendation, and a predicted recovery result for the network issue.

In a possible implementation, before the second device receives the first information sent by the first device, the method further includes:

the second network device sends network data to the first network device, so that the first network device determines the first information based on the network data.

In a possible implementation, the method further includes:

the second network device sends a network issue troubleshooting result to the first network device.

In a possible implementation, the first information is network issue intent information.

According to a third aspect, an embodiment of this application provides a network issue troubleshooting method, including:

A first device determines first information, where the first information includes network issue information, and the network issue information indicates a network issue to be troubleshot by a second device;

the first device sends the first information to the second device; and the second device troubleshoots, based on the first information, the network issue to be troubleshot.

In a possible implementation, the first information includes at least one of the following information:

diagnosis indication information, indicating diagnosis of the network issue to be troubleshot;

recovery indication information, indicating recovery of the network issue to be troubleshot; and query indication information, indicating query of the network issue to be troubleshot.

In a possible implementation, the first information further includes at least one of the following information:

a first duration, indicating that another rectification is not allowed within the first duration when the network issue to be troubleshot is rectified; and a second duration, indicating to verify, within the second duration, whether the network issue to be troubleshot is successfully rectified.

In a possible implementation, the network issue information includes at least one of the following information: a network issue identifier, a network issue scope, a network issue type, and a network issue name.

In a possible implementation, the network issue scope includes at least one of the following:

a network element, indicating that a network issue of the network element is a network issue to be troubleshot;

a cell, indicating that a network issue of the cell is a network issue to be troubleshot;

a geographic region, indicating that a network issue of the geographic region is a network issue to be troubleshot;

a tracking region, indicating that a network issue of the tracking region is a network issue to be troubleshot;

a network issue type, indicating that a network issue whose type is the network issue type is a network issue to be troubleshot; and a network issue name, indicating that a network issue whose name is the network issue name is a network issue to be troubleshot.

In a possible implementation, before the first device determines the first information, the method further includes:

the second network device sends second information to the first network device, where the second information includes a network issue identifier and at least one of the following information: a network issue cause, a network issue recovery capability, a network issue recovery recommendation, and a predicted recovery result for the network issue; and the first network device determines the first information based on the second information.

In a possible implementation, before the first device determines the first information, the method further includes:

the first network device obtains network data; and the first network device determines the first information based on the network data.

In a possible implementation, the first information is network issue intent information.

According to a fourth aspect, an embodiment of this application provides a network issue troubleshooting system, including a first device and a second device.

The first device is configured to determine first information, and send the first information to the second device, where the first information includes network issue information, and the network issue information indicates a network issue to be troubleshot by a second device.

The second device is configured to troubleshoot, based on the first information, the network issue to be troubleshot.

According to a fifth aspect, an embodiment of this application provides a network issue troubleshooting device, including: a processor and a memory and a communication interface both connected to the processor.

The communication interface is configured to communicate with another device.

The processor is configured to run instructions or a program in the memory, so that the communication device performs the network issue troubleshooting method according to any of the implementations of the first aspect.

According to a sixth aspect, an embodiment of this application provides a network issue troubleshooting device, including: a processor and a memory and a communication interface both connected to the processor.

The communication interface is configured to communicate with another device.

The processor is configured to run instructions or a program in the memory, so that the communication device performs the network issue troubleshooting method according to any of the implementations of the second aspect.

According to a seventh aspect, an embodiment of this application provides a computer-readable storage medium. The computer-readable storage medium stores computer readable instructions which, when run on a computer, causes the method according to any one of the possible implementations of the first aspect, the second aspect, and the third aspect to be performed.

DESCRIPTION OF EMBODIMENTS

Figure 1:
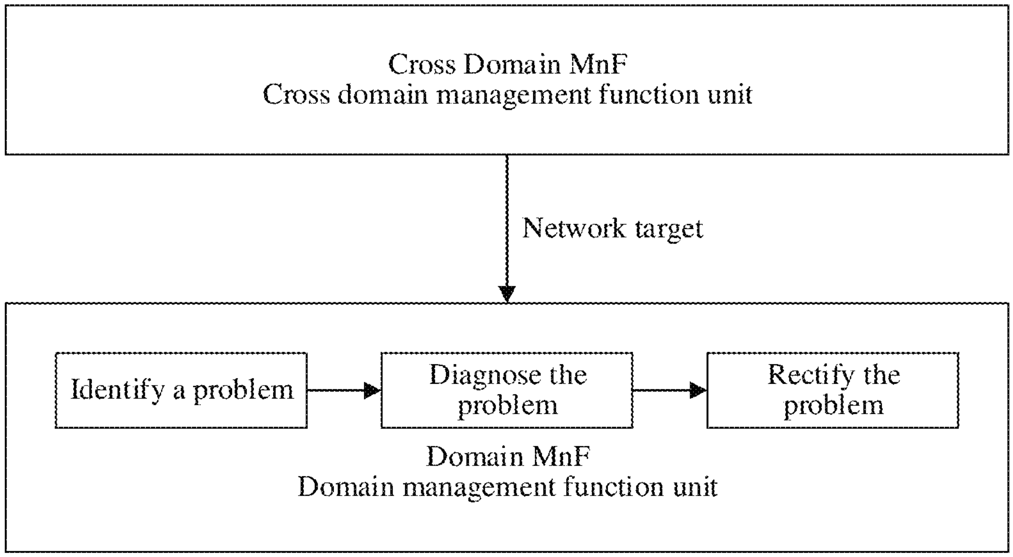
FIG. 1 is a schematic diagram of a conventional network issue troubleshooting according to an embodiment of this application.

Currently, a common method for troubleshooting network issues is that a cross domain management function (Cross Domain MnF) unit delivers network targets to a domain management function (Domain MnF) unit, and the domain MnF identifies, diagnoses, and rectifies issues for corresponding network targets, as shown in FIG. 1.

When the cross domain MnF is an operators' network management system and the domain MnF is a vendors' network management system, the operators' network management system can indicate the vendors' network management system to identify, diagnose, and rectify issues for a specific NE or a type of NEs. The vendors' network management system manages network issues throughout the whole life cycle. That is, the vendors' network management system determines which issues are to be diagnosed and rectified. In some specific cases, however, the operators' network management system may not expect some network issues to be resolved. However, in the current network issue troubleshooting method, the operators' network management system cannot determine which network issues are to be troubleshot and which network issues are not to be troubleshot. For example, if the vendors' network management system detects a problem of weak coverage in an area where few users exist, operators may not expect to resolve the problem of weak coverage.

In order to resolve a problem that different devices have different specifications for troubleshooting network issues, embodiments of this application provide a network issue diagnosing method, device, and system.

Figure 2:
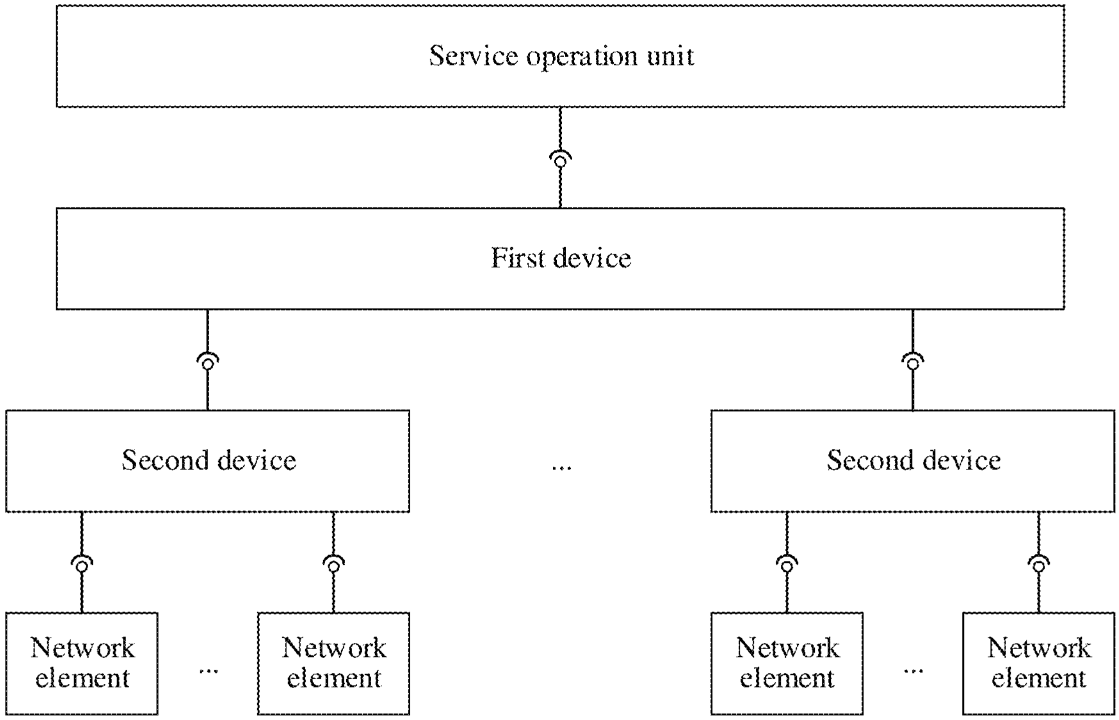
FIG. 2 is a schematic diagram of a network architecture applicable to an embodiment of this application according to an embodiment of this application.

A network issue diagnosing method, device, and system according to embodiments of this application may be applied to a network architecture shown in FIG. 2. As shown in the figure, the architecture includes a first device and a second device.

The first device may be a cross domain management function unit (may also be referred to as a network management function (network management function, NMF)). The cross domain management function unit may be configured to provide one or more of the following functions or management services: network life cycle management, network deployment, network fault management, network performance management, network configuration management, network guarantee, network optimization function, translation of intent from communication service provider (intent from communication service provider, intent-CSP), translation of intent from communication service consumer (intent from communication service consumer, intent-CSC), and the like. The foregoing network may include one or more network elements, subnetworks, or network slices. For example, a cross domain management function unit may be a network slice management function (network slice management function, NSMF), or a management data analytic function (management data analytic function, MDAF), or a cross domain self-organization network function (self-organization network function, SON-function), or a cross domain intent management function unit. In addition, in some scenarios, the cross domain management function unit may also be configured to provide a management function or management service of a subnetwork. The subnetwork may include a plurality of small subnetworks, or include a plurality of network slice subnetworks. For example, an operators' access network subnetwork includes an access network subnetwork of vendor 1 and an access network subnetwork of vendor 2.

The second device may be a domain management function (may also be referred to as a subnetwork management function (subnetwork management function, NMF)) unit or a network element/function management function (network element/function management function) unit. The domain management function unit may be configured to provide one or more of the following functions or management services: subnetwork or network element life cycle management, subnetwork or network element deployment, subnetwork or network element fault management, subnetwork or network element performance management, subnetwork or network element guarantee, subnetwork or network element optimization management, and translation of intent from subnetworks or network elements. A subnetwork may include one or more network elements; or a subnetwork may include one or more subnetworks, that is, one or more subnetworks form a subnetwork with a larger coverage area; or a subnetwork may include one or more network slice subnetworks.

Specifically, the subnetwork may be a network of some technical domain, for example, a radio access network, a core network, or a transmission network; or may be a network of a specific standard, for example, a global system for mobile communications (global system for mobile communications, GSM) network, a long term evolution (long term evolution, LTE) network, or a 5th Generation mobile communication technology (5G) network; or may be a network provided by a vendor, for example, a network provided by vendor X; or may be a network of a specific geographic region, for example, a network of factory A or a network of prefecture-level city B.

A network element (net element, NE) is an entity that provides network services. The NE may be a core network element, an access network element, or the like. For example, a core network element may include but is not limited to an access and mobility management function (access and mobility management function, AMF) entity, a session management function (session management function, SMF) entity, a policy control function (policy control function, PCF) entity, a network data analysis function (network data analysis function, NWDAF) entity, a network repository function (network repository function, NRF), a gateway. An access network element may include but is not limited to various base stations (for example, a generation NodeB (generation NodeB, gNB)), an evolved NodeB (evolved NodeB, eNB), a central unit control panel (central unit control panel, CUCP), a central unit (central unit, CU), a distributed unit (distributed unit, DU), and a central unit user panel (central unit user panel, CUUP). In embodiments of this application, a network function (network function, NF) may also be referred to as a network element.

In addition, the architecture may further include a service operation unit, which may also be referred to as a communication service management function (communication service management function) unit. The service operation unit may provide function and management services such as charging, settlement, accounting, customer service, business, network monitoring, life cycle management of communication service, and translation of intent from service. The service operation unit may include an operators' operating system or vertical operational technology system (vertical operational technology system).

In addition, the service-oriented management architecture focuses on a management service producer (management service producer, MnS Producer) and a management service consumer (management service consumer, MnS Consumer). It should be understood that, when a management service is a management service provided by the foregoing service operation unit, the service operation unit is a management service provider, and another service operator unit may be a management service consumer. When a management service is a management service provided by the cross domain management function unit, the cross domain management function unit is a management service provider, and the service operation unit is a management service consumer. When a management service is a management service provided by the domain management function unit, the domain management function unit is a management service provider, and the cross domain management function unit or the service operation unit is a management service consumer. When a management service is a management service provided by the foregoing network element, the network element is a management service provider, and the domain management function unit, the cross domain management function unit, or the service operation unit is a management service consumer.

Figure 3:
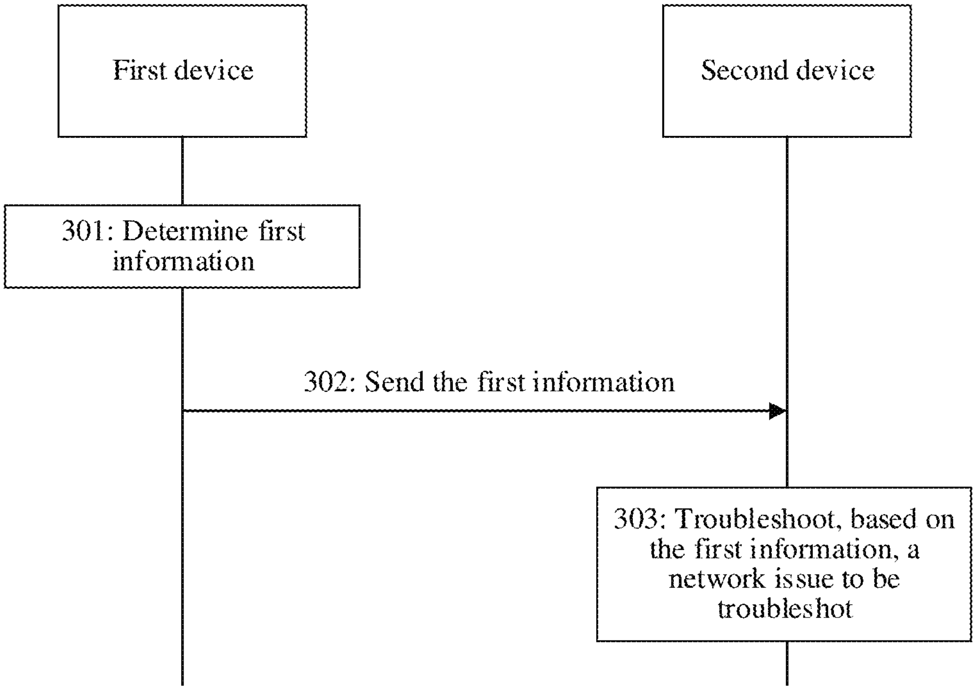
FIG. 3 is a first schematic flowchart of a network issue troubleshooting method according to an embodiment of this application.

FIG. 3 is a schematic flowchart of an issue diagnosing method according to an embodiment of this application. The process may be applied to the system shown in FIG. 2. As shown in FIG. 3, the method may include the following steps.

Step 301: A first device determines first information. The first information includes network issue information for indicating a network issue to be troubleshot by a second device.

For example, the first information may be network issue intent information (network issue intent information) or network maintenance intent information (network maintenance intent information).

Step 302: The first device sends the first information to the second device.

Step 303: The second device troubleshoots, based on the first information, a network issue to be troubleshot.

The first information may include at least one of the following information:

diagnosis indication information, indicating diagnosis of the network issue to be troubleshot.

recovery indication information, indicating recovery of the network issue to be troubleshot.

query indication information, indicating query of the network issue to be troubleshot.

For example, the first information may include an intent type (IntentType) field for indicating whether the first information is intended to diagnose, rectification, or query a network issue.

Correspondingly, if the first information includes the diagnosis indication information, the second device diagnoses the network issue to be troubleshot after receiving the first information; if the first information includes the recovery indication information, the second device rectifies the network issue to be troubleshot; and if the first information includes the query indication information, the second device queries the network issue to be troubleshot.

In some scenarios, the first information may include only one of diagnosis indication information, recovery indication information, and query indication information. In some other scenarios, the first information may alternatively include more of diagnosis indication information, recovery indication information, and query indication information. For example, if the first information includes the diagnosis indication information and the recovery indication information, the second device diagnoses and rectifies the network issue to be troubleshot. Alternatively, the first information may include indication information for multiple processing operations, for example, indication information for indicating diagnosis and rectification.

In a possible implementation, network issue information in the first information may include at least one of the following information: a network issue identifier, a network issue scope, a network issue type, and a network issue name.

Specifically, the network issue identifier may be one network issue identifier, or may include a plurality of network issue identifiers, that is, a list of network issues.

The network issue scope indicates the scope within which a network issue to be troubleshot occurs. In some embodiments, the network issue scope includes at least one of the following:

- a network element, indicating that a network issue of the network element is a network issue to be troubleshot, where for example, network issue information may include an identifier of one or more gNBs, indicating that a network issue of the one or more gNBs is a network issue to be troubleshot by the second device;
- a cell, indicating that a network issue of the cell is a network issue to be troubleshot, where for example, network issue information may include an identifier of one or more cells, indicating that a network issue of the one or more cells is a network issue to be troubleshot by the second device;
- a geographic region, indicating that a network issue of the geographic region is a network issue to be troubleshot, where for example, if network issue information may include an identifier of Haidian District, Beijing, the second device queries, diagnoses, or rectifies the network issue in Haidian District, Beijing; for another example, if network issue information may include longitude and latitude area information, that is, a group of longitude and latitude points, the second device queries, diagnoses, or rectifies a network issue in the longitude and latitude area;
- a tracking region, indicating that a network issue of the tracking region is a network issue to be troubleshot, where for example, if network issue information may include one or more tracking region codes (track area codes, TACs), the second device queries, diagnoses, or rectifies a network issue in a tracking region;
- a network issue type, indicating that a network issue whose type is the network issue type is a network issue to be troubleshot, where for example, if network issue information includes an indication information of coverage type, the network issue of the coverage type is a network issue to be troubleshot; and
- a network issue name, indicating that a network issue whose name is the network issue name is a network issue to be troubleshot, where for example, if network issue information includes weak coverage indication information, the network issue whose name is weak coverage is a network issue to be troubleshot.

When the scope of a network issue includes many of the foregoing items, an intersection or a union of the multiple scopes may be obtained, as pre-defined. For example, as pre-agreed, an intersection is obtained when multiple network scopes are included. In this case, when the network issue information in the first information includes a geographic region C and a network issue type D, a network issue whose type is D in the geographic region C is a network issue to be troubleshot.

There may be the following types of network issues: coverage, rate, capacity, device fault, service experience, mobility, energy consumption, and the like.

There may be the following network issue names classified by network types.

- network issue names classified by coverage types, including weak coverage, coverage hole, overshoot coverage, mismatch between uplink and downlink, pilot pollution, and the like;
- network issue names classified by rate types, including low average rate, many low-rate users, few high-rate users, and the like;
- network issue names classified by capacity types, including high load, load imbalance, congestion, and the like;
- network issue names classified by device fault types, including base station disconnection, fronthaul/optical port, clock, cell exception, standing wave, and the like;
- network issue names classified by service experience types, including: long delay, large jitter, low access success rate, high call drop rate, high packet loss rate, and the like;
- network issue names classified by mobility types, including low handover success rate, high premature handover rate, high delayed handover rate, frequent PingPong (PingPong), and the like; and
- network issue names classified by energy consumption types, including high energy consumption, low traffic and high energy consumption, and the like.

It should be understood that the scopes, types and names of the foregoing network issue are merely examples, and may include but are not limited thereto.

In a specific embodiment, when the first information is a network issue intent information, the first information may include fields shown in Table 1.

TABLE 1

| Attribute name (Attribute Name) | isReadable (Readable or Not) | isWritable (Writable or Not) |
|---|---|---|
| IssueIntent_Id | T (Yes) | T |
| IntentType | T | T |
| IssueInfo | T | T |

IssueIntent_Id indicates an identifier of the network issue intent information. IntentType indicates an intent type of the network issue intent information, for example, indicating diagnosis, rectification, or query of a network issue, or diagnosis and recovery of a network issue to be troubleshot. IssueInfo indicates network issue information.

Further, IssueInfo may further include the fields shown in Table 2.

TABLE 2

| Attribute name (Attribute Name) | isReadable (Readable or Not) | isWritable (Writable or Not) |
|---|---|---|
| IssueIdList | T (Yes) | T |
| ScopeInfo | T | T |
| IssueType | T | T |
| IssueName | T | T |

IssueIdList indicates a list of network issues, that is, an identifier of one or more network issues. ScopeInfo indicates a scope of a network issue. IssueType indicates a type of a network issue. IssueName indicates a name of a network issue.

In a possible implementation, if the first information includes rectification and diagnosis information, the first information may further include a limitation condition for rectifying a network issue. Optionally, the limitation condition for rectifying the network issue may include first duration and/or second duration. The first duration indicates that another rectification is not allowed within the first duration when the network issue to be troubleshot is rectified. For example, if the first duration is one hour, it indicates that another rectification for the same issue is not allowed within one hour after rectification for the network issue to be troubleshot is initiated. The second duration indicates, to verify within the second duration, whether the network issue to be troubleshot is successfully rectified. For example, if the second duration is 0.5 hours, it indicates to verify, within 0.5 hours after the rectification is initiated, whether the network issue to be troubleshot is successfully rectified.

In a possible implementation, before performing step 301, the first device may further obtain second information, and determine the first information based on the second information.

In some embodiments, the second information may include identified network issues. For example, if the second device identifies that some network issues exist, the second device sends the second information to the first device; and the first device determines, based on the received second information and a diagnosis policy of the first device, which issues are to be diagnosed, so as to determine the first information for indicating diagnosis of a network issue to be troubleshot.

In some other embodiments, the second information may include a network issue cause, a network issue recovery capability, a network issue recovery recommendation, a predicted recovery result for the network issue, and the like. For example, the first device sends a request for diagnosing a network issue to the second device; the second device determines, after diagnosing a network issue to be troubleshot, a diagnosis result including a network issue cause, a recovery capability, a recovery recommendation, and a predicted recovery result, and sends the determined diagnosis result (that is, second information) to the first device; and the first device determines, based on the second information and a recovery policy of the first device, which issues are to be rectified, so as to determine first information for indicating recovery of a network issue to be troubleshot.

In still some embodiments, the second information may alternatively be network data. For example, the first device may obtain network data from the second device or another device, and perform analysis based on obtained network data to determine an existing or possible network issue, and determine, based on the diagnosis policy, which issues are to be diagnosed, so as to determine the first information for indicating diagnosis of a network issue to be troubleshot.

Optionally, the diagnosis policy of the first device may include one or more of the following: the first device determines, based on user complaint information, which network issues are to be diagnosed, for example, a network issue in an area where there are user complaints to be diagnosed; the first device determines, based on whether a network issue occurs in an overlapping area of two areas, whether an issue is to be diagnosed, for example, the network issue in the overlapping area of two areas is to be diagnosed; and the first device determines, based on the type of a network issue, whether diagnosis is to be performed, for example, a network issue of a rate type is diagnosed, and a network issue of a coverage type does is not diagnosed.

Optionally, the recovery policy of the first device may further include one or more of the following: the first device determines, based on a network issue diagnosis capability in a network issue diagnosis result, a network issue that is to be rectified, for example, a network issue whose network issue diagnosis capability is recoverable is a network issue that is to be rectified; the first device determines, based on a network issue cause in the network issue diagnosis result, a network issue that is to be rectified, for example, a network issue whose cause is E is to be rectified, and a network issue whose cause is a software problem or a configuration problem is to be rectified; the first device determines, based on a network issue recovery recommendation in the network issue diagnosis result, a network issue that is to be rectified, for example, a network issue for which a modification suggestion is to modify a configuration parameter F may be rectified, and a network issue for which the modification suggestion is to modify other configuration parameters is not to be rectified; and the first device determines, based on the predicted recovery result of the network issue in the network issue diagnosis result, a network issue that is to be rectified, for example, if a predicted recovery result of a low-rate network issue does not reach a preset level, the first device does not perform recovery.

In order to clearly understand the foregoing embodiments of this application, the method for troubleshooting network issue provided in embodiments of this application is described with reference to FIG. 4 to FIG. 8.

Figure 4:
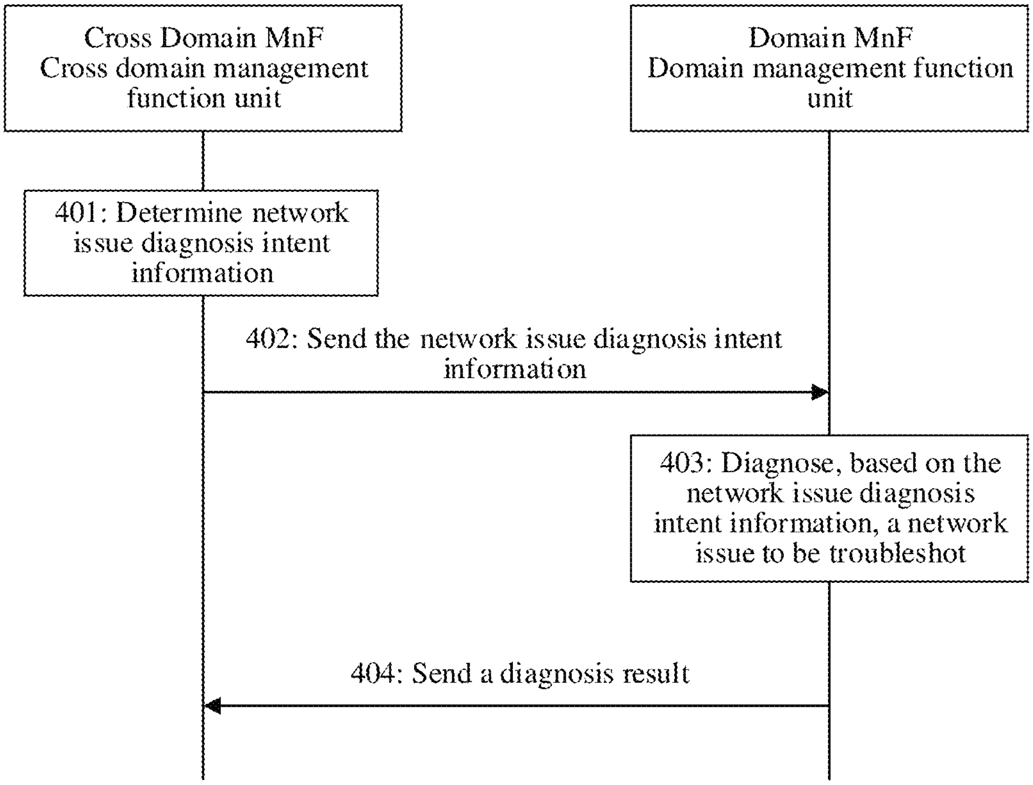
FIG. 4 is a second schematic flowchart of a network issue troubleshooting method according to an embodiment of this application.

When the first information indicates diagnosis of an issue to be troubleshot, a network issue troubleshooting process may be shown in FIG. 4, and includes the following steps.

Step 401: A cross domain MnF determines network issue diagnosis intent information (first information).

Step 402: The cross domain MnF sends the network issue diagnosis intent information to a domain MnF.

Optionally, after receiving the network issue diagnosis intent information, the domain MnF may create a network issue diagnosis intent object based on the network issue diagnosis intent information, where the network issue diagnosis intent object includes the network issue diagnosis intent information.

Step 403: The domain MnF diagnoses, based on the network issue diagnosis intent information, a network issue to be troubleshot, to obtain a diagnosis result.

Step 404: The domain MnF sends the diagnosis result to the cross domain MnF.

Figure 5:
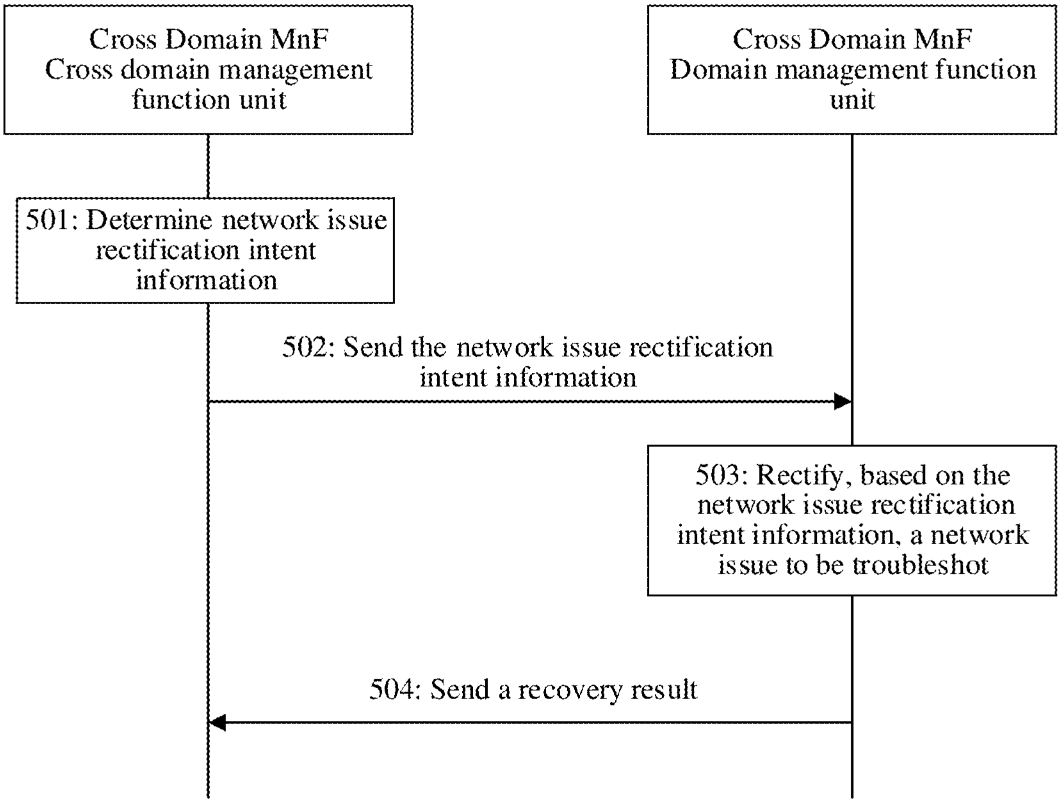
FIG. 5 is a third schematic flowchart of a network issue troubleshooting method according to an embodiment of this application.
Figure 6:
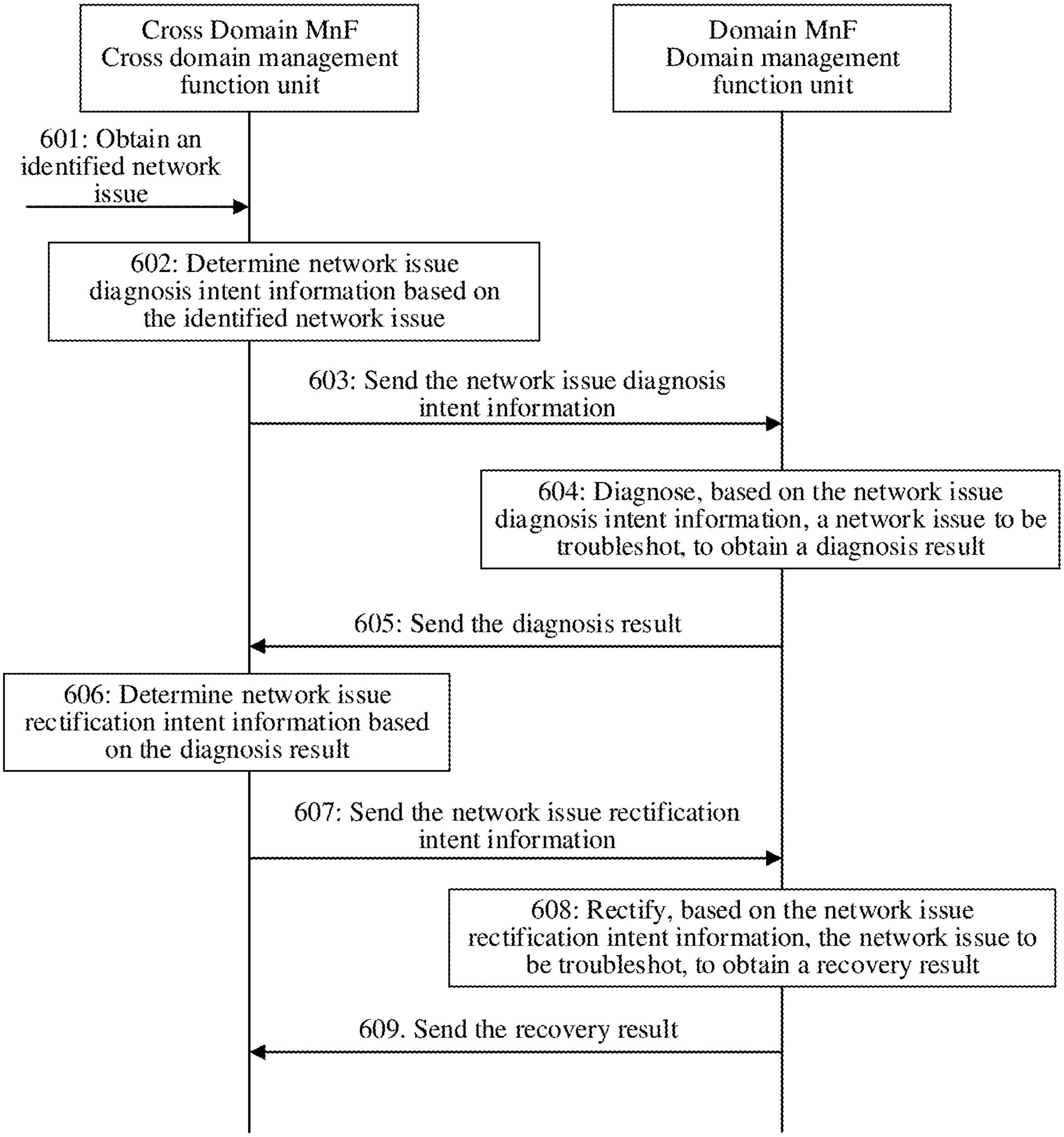
FIG. 6 is a fourth schematic flowchart of a network issue troubleshooting method according to an embodiment of this application.

When the first information indicates recovery of an issue to be troubleshot, a network issue troubleshooting process may be shown in FIG. 5, and includes the following steps.

Step 501: A cross domain MnF determines network issue rectification intent information (first information).

Step 502: The cross domain MnF sends the network issue rectification intent information to a domain MnF.

Optionally, after receiving the network issue rectification intent information, the domain MnF may create a network issue rectification intent object based on the network issue rectification intent information, where the network issue rectification intent object includes the network issue rectification intent information.

Step 503: The domain MnF rectifies, based on the network issue rectification intent information, a network issue to be troubleshot, to determine a recovery result.

Step 504: The domain MnF sends the recovery result to the cross domain MnF.

In some embodiments, a network issue usually is to be diagnosed and rectified. A processing for troubleshooting the network issue may be shown in FIG. 6, and includes the following steps.

Step 601: A cross domain MnF obtains an identified network issue.

The network issues can be identified by a domain MnF or another device.

Step 602: The cross domain MnF determines network issue diagnosis intent information based on the identified network issue.

Step 603: The cross domain MnF sends the network issue diagnosis intent information to the domain MnF.

Optionally, after receiving the network issue diagnosis intent information, the domain MnF may create a network issue diagnosis intent object based on the network issue diagnosis intent information, where the network issue diagnosis intent object includes the network issue diagnosis intent information.

Step 604: The domain MnF diagnoses, based on the network issue diagnosis intent information, a network issue to be troubleshot, to obtain the diagnosis result.

Step 605: The domain MnF sends the diagnosis result to the cross domain MnF.

Step 606: The cross domain MnF determines network issue rectification intent information based on the diagnosis result.

Step 607: The cross domain MnF sends the network issue rectification intent information to the domain MnF.

Optionally, after receiving the network issue rectification intent information, the domain MnF may create a network issue rectification intent object based on the network issue rectification intent information, where the network issue rectification intent object includes the network issue rectification intent information.

Step 608: The domain MnF rectifies, based on the network issue rectification intent information, a network issue to be troubleshot, to determine a recovery result.

Step 609: The domain MnF sends the recovery result to the cross domain MnF.

In the process of step 601 to step 604 above, the identified network issue may be considered as second information, and the network issue diagnosis intent information determined by the cross domain MnF may be considered as first information.

In the process of step 605 to step 608 above, the diagnosis result may be considered as second information, and the network issue rectification intent information determined by the cross domain MnF may be considered as first information.

Figure 7:
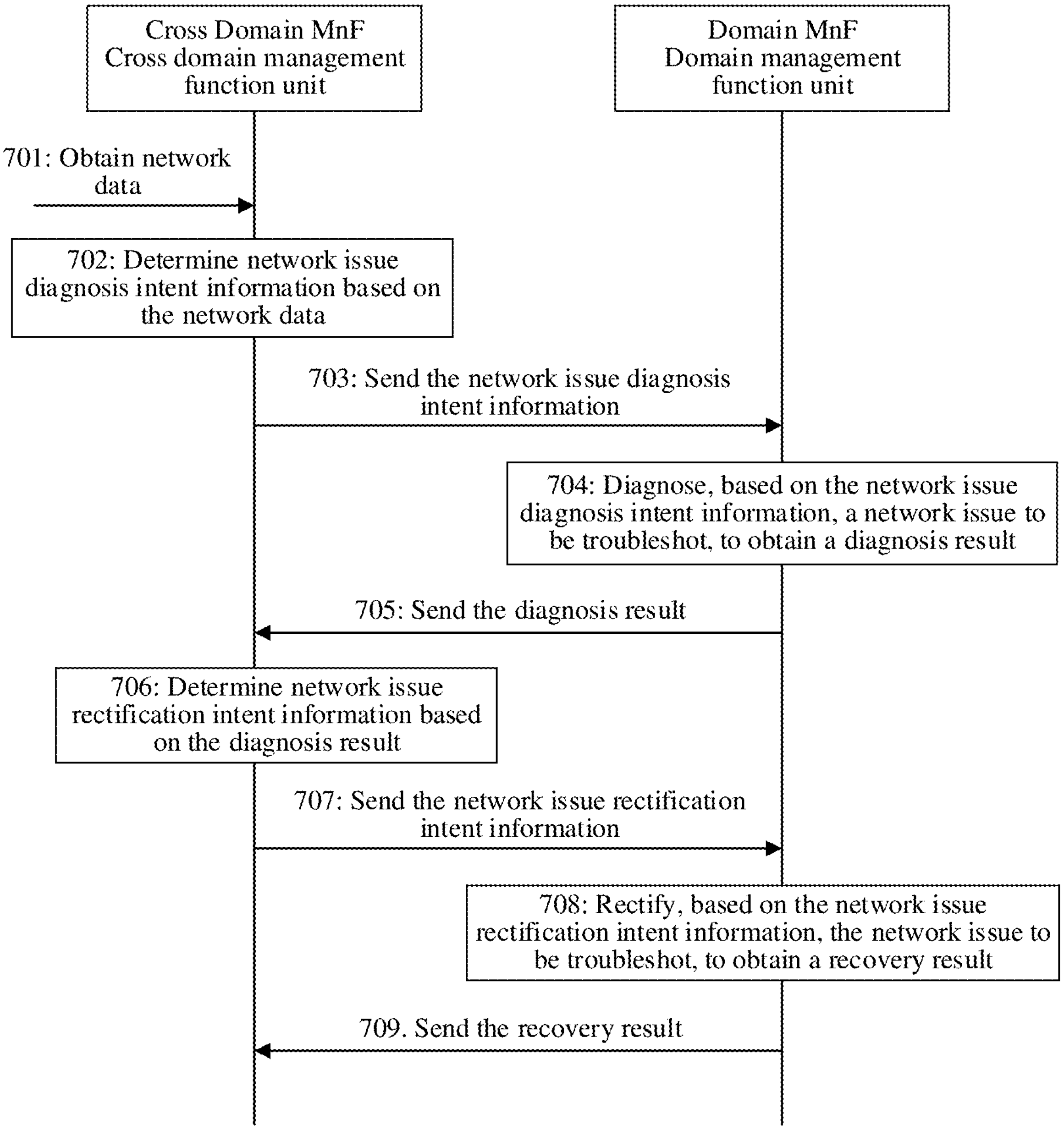
FIG. 7 is a fifth schematic flowchart of a network issue troubleshooting method according to an embodiment of this application.

In some other embodiments, a process of diagnosing and recovering a network issue may alternatively be shown in FIG. 7, and includes the following steps.

Step 701: A cross domain MnF obtains network data.

Step 702: The cross domain MnF determines network issue diagnosis intent information based on the network data.

Specifically, the cross domain MnF may determine a network issue based on the network data, and further determine a network issue that is to be diagnosed, so as to generate the network issue diagnosis intent information.

Step 703 to step 709 are similar to step 603 to step 609, and details are not described herein again.

Figure 8:
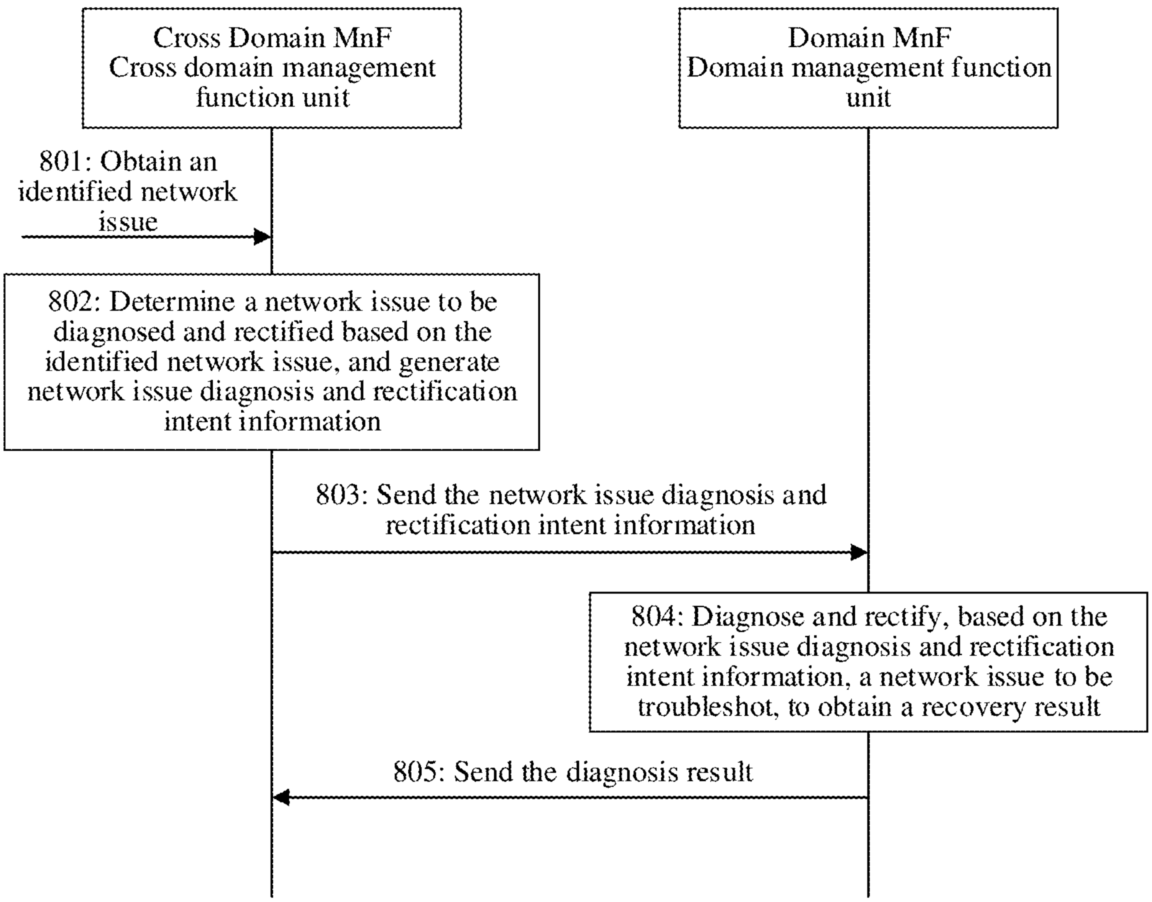
FIG. 8 is a sixth schematic flowchart of a network issue troubleshooting method according to an embodiment of this application.

In still some embodiments, a process of diagnosing and rectifying a network issue may be shown in FIG. 8, and includes the following steps.

Step 801: A cross domain MnF obtains an identified network issue.

Step 802: The cross domain MnF determines a network issue to be diagnosed and rectified based on the identified network issue, and generates network issue diagnosis and rectification intent information.

The network issue diagnosis and rectification intent information may be used as first information, and the first information includes indication information indicating diagnosis and rectification.

Step 803: The cross domain MnF sends the network issue diagnosis and rectification intent information to a domain MnF.

Optionally, after receiving the network issue diagnosis and rectification intent information, the domain MnF may create network issue diagnosis and rectification intent object based on the network issue diagnosis intent information, where the network issue diagnosis and rectification intent object includes the network issue diagnosis and rectification intent information. Alternatively, a network issue diagnosis intent object and a network issue rectification intent object may be respectively created.

Step 804: The domain MnF diagnoses and rectifies, based on the network issue diagnosis and rectification intent information, a network issue to be troubleshot, to obtain a recovery result.

Step 805: The domain MnF sends the recovery result to the cross domain MnF.

Similarly, in the foregoing step 801, the identified network issue obtained by the cross domain MnF may alternatively be replaced by obtained network data. In step 802, the cross domain MnF determines the network issue based on the obtained network data, determines the network issue that is to be diagnosed and rectified, and generates network issue diagnosis and rectification intent information.

In a conventional method for troubleshooting a network issue, a second device manages a network issue throughout the whole life cycle, that is, the second device determines which issues are to be diagnosed and rectified. In some specific cases, however, the first device may not expect some network issues to be diagnosed or rectified, but the second device cannot obtain the intent of the first device before troubleshooting the network issues. In this application, this problem can be effectively resolved by sending the first information by the first device to the second device, where the first information includes network issue information, so that the second device can troubleshoot, based on the indication of the first device, a network issue that the first device expects to troubleshoot.

Based on a same technical concept, an embodiment of this application further provides a network issue troubleshooting device. The device may be used in a network architecture provided in embodiments of this application, and is configured to implement the steps performed by a first device in the foregoing method embodiments.

In a possible design, the network issue troubleshooting device may include modules that are in a one-to-one correspondence with the methods/operations/steps/actions performed by the first device in the foregoing method embodiments. The modules may be hardware circuits or software, or may be implemented by a combination of the hardware circuits and the software.

Figure 9:
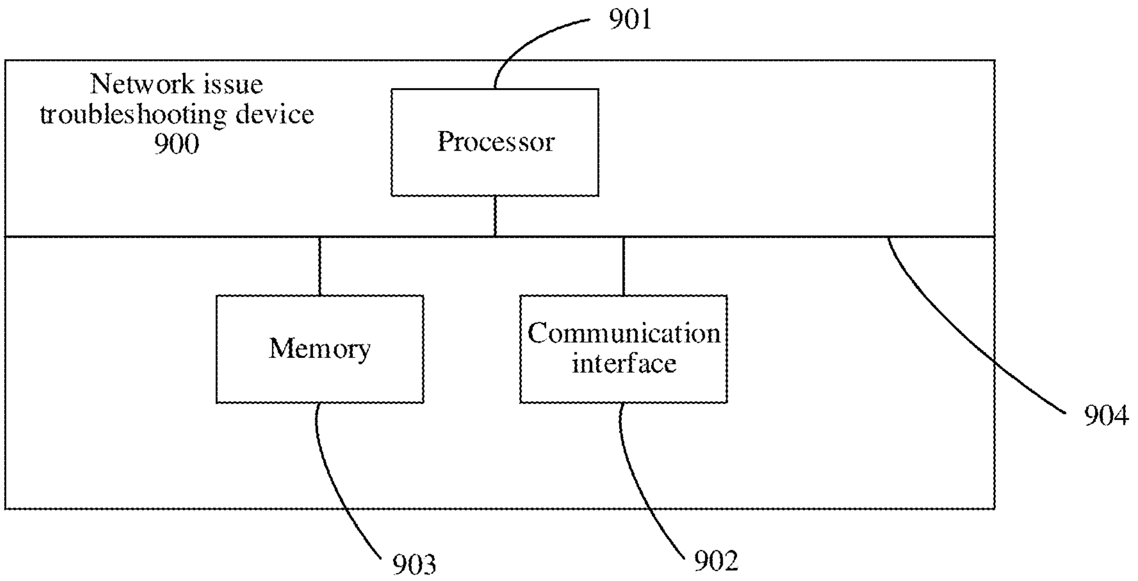
FIG. 9 is a schematic structural diagram of a network issue troubleshooting device 900 according to an embodiment of this application.

In another possible design, the network issue troubleshooting device 900 may include a processor 901 shown in FIG. 9, and a communication interface 902 connected to the processor 901.

The processor 901 may be a general-purpose processor, a microprocessor, an application specific integrated circuit (application specific integrated circuit, ASIC), a field programmable gate array (field programmable gate array, FPGA), or another programmable logic device, a discrete gate, or a transistor logic device, or one or more integrated circuits configured to control program execution of the solutions in this application. The general-purpose processor may be a microprocessor, any conventional processor, or the like. The steps of the methods disclosed with reference to embodiments of this application may be directly performed by a hardware processor, or may be performed by using a combination of hardware and software modules in the processor.

The communication interface 902 uses any apparatus such as a transceiver to communicate with another device or a communication network such as an Ethernet, a radio access network (radio access network, RAN), or a wireless local area network (wireless local area network, WLAN).

Further, the network issue troubleshooting device may further include a memory 903 and a communication bus 904.

The memory 903 is configured to store program instructions and/or data, so that the processor 901 calls the instructions and/or the data stored in the memory 903, to implement the foregoing functions of the processor 901. The memory 903 may be a read-only memory (read-only memory, ROM) or another type of static storage device capable of storing static information and instructions, a random access memory (random access memory, RAM) or another type of dynamic storage device capable of storing information and instructions. It may also be an electrically erasable programmable read-only memory (electrically erasable programmable read-only memory, EEPROM) or any other medium for carrying or storing desired program code in a form of an instruction or a data structure and accessible by a computer, but is not limited thereto. The memory 903 may exist independently, for example, an off-chip memory, and is connected to the processor 901 through the communication bus 904. Alternatively, the memory 903 and the processor 901 may be integrated together.

The communication bus 904 may include a path for transferring information between the foregoing components.

In this embodiment of this application, the processor 901 is configured to call the communication interface 902 to perform a receiving and/or sending function.

The processor 901 is configured to perform the following steps:

determining first information, where the first information includes network issue information, and the network issue information indicates a network issue to be troubleshot by a second device; and sending the first information to the second device.

In a possible implementation, the first information includes at least one of the following information:

diagnosis indication information, indicating diagnosis of the network issue to be troubleshot;

recovery indication information, indicating recovery of the network issue to be troubleshot; and query indication information, indicating query of the network issue to be troubleshot.

In a possible implementation, the first information further includes at least one of the following information:

a first duration, indicating that another rectification is not allowed within the first duration when the network issue to be troubleshot is rectified; and a second duration, indicating to verify, within the second duration, whether the network issue to be troubleshot is successfully rectified.

In a possible implementation, the network issue information includes at least one of the following information: a network issue identifier, a network issue scope, a network issue type, and a network issue name.

In a possible implementation, the network issue scope includes at least one of the following:

a network element, indicating that a network issue of the network element is a network issue to be troubleshot;

a cell, indicating that a network issue of the cell is a network issue to be troubleshot;

a geographic region, indicating that a network issue of the geographic region is a network issue to be troubleshot;

a tracking region, indicating that a network issue of the tracking region is a network issue to be troubleshot;

a network issue type, indicating that a network issue whose type is the network issue type is a network issue to be troubleshot; and a network issue name, indicating that a network issue whose name is the network issue name is a network issue to be troubleshot.

In a possible implementation, the processor 901 is further configured to obtain second information, where the second information includes a network issue identifier and at least one of the following: a network issue cause, a network issue recovery capability, a network issue recovery recommendation, and a predicted recovery result for the network issue.

When determining the first information, the processor 901 is specifically configured to: determine the first information based on the second information.

In a possible implementation, the processor 901 is further configured to obtain network data.

When determining the first information, the processor 901 is specifically configured to: determine the first information based on the obtained network data.

In a possible implementation, the processor 901 is further configured to receive a network issue troubleshooting result.

In a possible implementation, the first information is network issue intent information.

Based on a same technical concept, an embodiment of this application further provides a network issue troubleshooting device. The device may be used in a network architecture provided in embodiments of this application, and is configured to implement the steps performed by a second device in the foregoing method embodiments.

In a possible design, the network issue troubleshooting device may include modules that are in a one-to-one correspondence with the methods/operations/steps/actions performed by the second device in the foregoing method embodiments. The modules may be hardware circuits or software, or may be implemented by a combination of the hardware circuits and the software.

Figure 10:
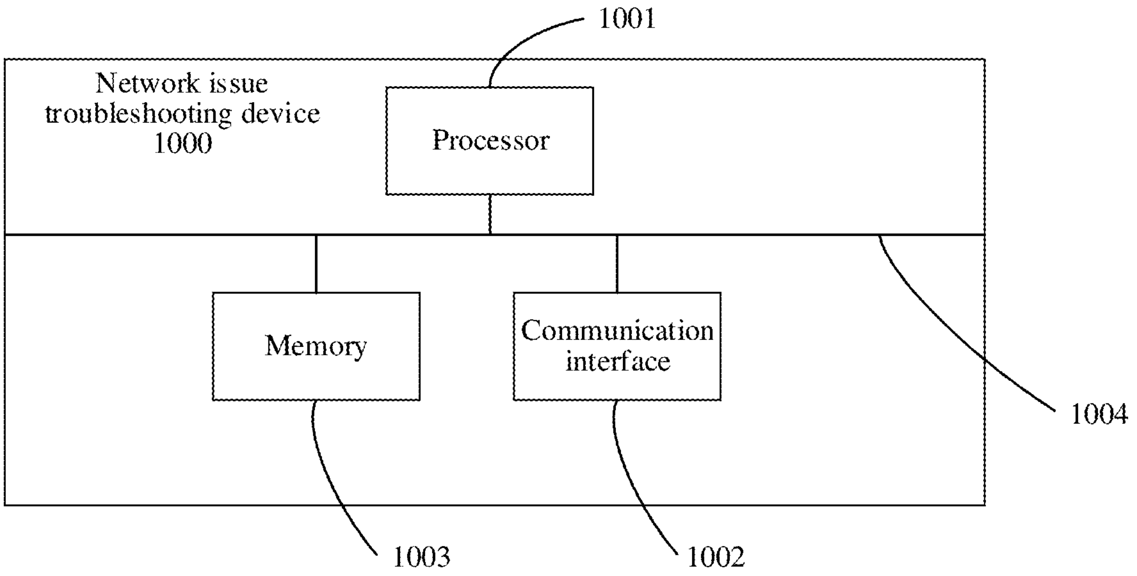
FIG. 10 is a schematic structural diagram of a network issue troubleshooting device 1000 according to an embodiment of this application.

In another possible design, the network issue troubleshooting device 1000 may include a processor 1001 shown in FIG. 10, and a communication interface 1002 connected to the processor 1001.

The processor 1001 may be a general-purpose processor, a microprocessor, an ASIC, a field programmable gate array or another programmable logic device, a discrete gate or a transistor logic device, one or more integrated circuits configured to control program execution in the solutions of this application, or the like. The general-purpose processor may be a microprocessor, any conventional processor, or the like. The steps of the methods disclosed with reference to embodiments of this application may be directly performed by a hardware processor, or may be performed by using a combination of hardware and software modules in the processor.

The communication interface 1002 uses any apparatus such as a transceiver, and is configured to communicate with another device or a communication network, for example, an Ethernet, a RAN, or a WLAN.

Further, the network issue troubleshooting device may further include a memory 1003 and a communication bus 1004.

The memory 1003 is configured to store program instructions and/or data, so that the processor 1001 calls the instructions and/or the data stored in the memory 1003, to implement the foregoing functions of the processor 1001. The memory 1003 may be a ROM or other type of static storage device capable of storing static information and instructions, a RAM or another type of dynamic storage device capable of storing information and instructions, or may be an EEPROM or any other medium that can be configured for carrying or storing desired program code in the form of an instruction or a data structure and accessible by a computer, but is not limited thereto. The memory 1003 may exist independently, for example, an off-chip memory, and is connected to the processor 1001 through the communication bus 1004. The memory 1003 may alternatively be integrated with the processor 1001.

The communication bus 1004 may include a path for transferring information between the foregoing components.

In this embodiment of this application, the processor 1001 is configured to call the communication interface 1002 to perform a receiving and/or sending function.

The processor 1001 is configured to perform the following steps:

receiving first information sent by a first device, where the first information includes network issue information, and the network issue information indicates a network issue to be troubleshot; and troubleshooting, based on the first information, the network issue to be troubleshot.

In a possible implementation, the first information includes at least one of the following information:

diagnosis indication information, indicating diagnosis of the network issue to be troubleshot;

recovery indication information, indicating recovery of the network issue to be troubleshot; and query indication information, indicating query of the network issue to be troubleshot.

In a possible implementation, the first information includes at least one of the following information:

a first duration, indicating that another rectification is not allowed within the first duration when the network issue to be troubleshot is rectified; and a second duration, indicating to verify, within the second duration, whether the network issue to be troubleshot is successfully rectified.

In a possible implementation, the network issue information includes at least one of the following information: a network issue identifier, a network issue scope, a network issue type, and a network issue name.

In a possible implementation, the network issue scope includes at least one of the following:

a network element, indicating that a network issue of the network element is a network issue to be troubleshot;

a cell, indicating that a network issue of the cell is a network issue to be troubleshot;

a geographic region, indicating that a network issue of the geographic region is a network issue to be troubleshot;

a tracking region, indicating that a network issue of the tracking region is a network issue to be troubleshot;

a network issue type, indicating that a network issue whose type is the network issue type is a network issue to be troubleshot; and a network issue name, indicating that a network issue whose name is the network issue name is a network issue to be troubleshot.

In a possible implementation, the processor 1001 is further configured to send second information to the first network device, so that the first network device determines the first information based on the second information.

The second information includes a network issue identifier and at least one of the following information: a network issue cause, a network issue recovery capability, a network issue recovery recommendation, and a predicted recovery result for the network issue.

In a possible implementation, the processor 1001 is further configured to send network data to the first network device, so that the first network device determines the first information based on the network data.

In a possible implementation, the processor 1001 is further configured to send a network issue troubleshooting result to the first network device.

In a possible implementation, the first information is network issue intent information.

Based on a same technical concept, an embodiment of this application further provides a network issue troubleshooting system. The system may include the network issue troubleshooting device 900 and at least one network issue troubleshooting device 1000 in the foregoing embodiments.

An embodiment of this application provides a computer-readable storage medium storing a computer program. The computer program includes instructions for performing the foregoing method embodiments.

An embodiment of this application provides a computer program product including instructions. The instructions, when executed on a computer, cause the method provided in the above embodiments to be performed.

In the description of embodiments of this application, "and/or" describes an association relationship for describing associated objects and represents that three relationships may exist. For example, A and/or B may represent the following cases: only A exists, both A and B exist, and only B exists. In this application, "a plurality of" means two or more than two.

In addition, it should be understood that, in the description of this application, the terms "first", "second", and "third" are merely intended for distinguishing a purpose of description and shall not to be understood as indication or implication of relative importance, or indication or implication of order. Reference to "one embodiment", "some embodiments", or the like described in this specification means that a particular feature, structure, or characteristic described in connection with the embodiment is included in one or more embodiments of this application. Therefore, phrases "in one embodiment", "in some embodiments", "in some other embodiments", "in some additional embodiments", and the like described in different parts in this specification do not mean that all necessarily refer to the same embodiment, but mean "one or more but not all of embodiments", unless otherwise specifically emphasized. The terms "comprising", "including", "having" and their variants all mean "including but not limited to", unless otherwise specifically emphasized.

An embodiment of this application provides a computer-readable storage medium storing a computer program. The computer program includes instructions for performing the foregoing method embodiments.

An embodiment of this application provides a computer program product including instructions. The instructions, when executed on a computer, cause the computer to perform the foregoing method embodiments.

A person skilled in the art should understand that embodiments of this application may be provided as a method, a system, or a computer program product. Therefore, this application may take the form of a complete hardware embodiment, a complete software embodiment, or an embodiment combining software and hardware. Moreover, this application may be in the form of a computer program product implemented on one or more computer-usable storage media (including, but not limited to, a disk storage, a CD-ROM, an optical storage, and the like) containing computer-usable program code therein.

This application is described with reference to the flowcharts and/or block diagrams of the method, the device (system), and the computer program product according to embodiments of this application. It should be understood that each process and/or block in the flowcharts and/or block diagrams, and a combination of the process and/or the block in the flowcharts and/or block diagrams may be implemented by using computer program instructions. These computer program instructions may be provided to a processor of a general-purpose computer, a special-purpose computer, an embedded processing machine, or other programmable data processing devices to generate a machine, so that execution of the instructions by the processor of the computer or other programmable data processing devices generates an apparatus for implementing functions specified in one or more processes of the flowchart and/or one or more blocks of the block diagram.

These computer program instructions may also be stored in a computer-readable storage that can direct a computer or other programmable data processing devices to operate in a specific manner, so that the instructions stored in the computer-readable memory produce a product including an instruction apparatus. The instruction apparatus implements the functions specified in one or more processes of the flowchart and/or one or more blocks of the block diagram.

These computer program instructions may also be loaded onto a computer or other programmable data processing devices, so that a series of operating steps are performed on the computer or other programmable devices to generate a computer-implemented process, and the instructions executed on the computer or other programmable devices provide steps for implementing the functions specified in one or more processes of the flowchart and/or one or more blocks of the block diagram.

Although example embodiments of this application have been described, a person skilled in the art can make additional changes and modifications to these embodiments once they know the basic creative concept. Therefore, the appended claims are intended to be interpreted as including the preferred embodiments and all changes and modifications falling within the scope of embodiments of this application.

It is clearly that a person skilled in the art can make various modifications and variations to embodiments of this application without departing from the scope of embodiments of this application. In this way, this application is intended to cover these modifications and variations to embodiments of this application provided that they fall within the scope of the claims of this application and their equivalent technologies.

What is claimed is:

1. A network issue troubleshooting method, comprising:

determining, by a first device, first information, wherein the first information comprises network issue information, and the network issue information is usable to indicate a network issue to be troubleshot by a second device, wherein the network issue information comprises at least one of a network issue identifier, a network issue scope, a network issue type, or a network issue name; and sending, by the first device, the first information to the second device.

2. The method according to claim 1, wherein the network issue information comprises the network issue type, and the first information further comprises at least one of the following information:

diagnosis indication information, usable to indicate a diagnosis of the network issue to be troubleshot;

recovery indication information, usable to indicate recovery of the network issue to be troubleshot; or query indication information, usable to indicate a query of the network issue to be troubleshot.

3. The method according to claim 1, wherein the first information further comprises at least one of the following information:

a first duration, usable to indicate that another rectification is not allowed within the first duration in response to the network issue to be troubleshot being rectified; or a second duration, usable to indicate to verify, within the second duration, whether the network issue to be troubleshot is successfully rectified.

4. The method according to claim 1, wherein the network issue information comprises more than one of the following: the network issue identifier, the network issue scope, the network issue type, or the network issue name.

5. The method according to claim 1, wherein the network issue scope comprises at least one of the following:

a network element, usable to indicate that a network issue of the network element is a network issue to be troubleshot;

a cell, usable to indicate that a network issue of the cell is a network issue to be troubleshot;

a geographic region, usable to indicate that a network issue of the geographic region is a network issue to be troubleshot;

a tracking region, usable to indicate that a network issue of the tracking region is a network issue to be troubleshot;

a network issue type, usable to indicate that a network issue whose type is the network issue type is a network issue to be troubleshot; or a network issue name, usable to indicate that a network issue whose name is the network issue name is a network issue to be troubleshot.

6. A network issue troubleshooting method, comprising:

receiving, by a second device, first information from a first device, wherein the first information comprises network issue information, and the network issue information is usable to indicate a network issue to be troubleshot, wherein the network issue information comprises at least one of a network issue identifier, a network issue scope, a network issue type, or a network issue name; and troubleshooting, by the second device based on the first information, the network issue to be troubleshot.

7. The method according to claim 6, wherein the network issue information comprises the network issue type, and the first information further comprises at least one of the following information:

diagnosis indication information, usable to indicate a diagnosis of the network issue to be troubleshot;

recovery indication information, usable to indicate recovery of the network issue to be troubleshot; or query indication information, usable to indicate a query of the network issue to be troubleshot.

8. The method according to claim 6, wherein the first information further comprises at least one of the following information:

a first duration, usable to indicate that another rectification is not allowed within the first duration in response to the network issue to be troubleshot being rectified; or a second duration, usable to indicate to verify, within the second duration, whether the network issue to be troubleshot is successfully rectified.

9. The method according to claim 6, wherein the network issue information comprises more than one of the following: a network issue identifier, a network issue scope, a network issue type, or a network issue name.

10. The method according to claim 6, wherein the network issue scope comprises at least one of the following:

a network element, usable to indicate that a network issue of the network element is a network issue to be troubleshot;

a cell, usable to indicate that a network issue of the cell is a network issue to be troubleshot;

a geographic region, usable to indicate that a network issue of the geographic region is a network issue to be troubleshot;

a tracking region, usable to indicate that a network issue of the tracking region is a network issue to be troubleshot;

a network issue type, usable to indicate that a network issue whose type is the network issue type is a network issue to be troubleshot; or a network issue name, usable to indicate that a network issue whose name is the network issue name is a network issue to be troubleshot.

11. An apparatus, comprising:

at least one processor; and a memory coupled to the at least one processor and having program instructions stored thereon which, when executed by the at least one processor, cause the apparatus to:

determine first information, wherein the first information comprises network issue information, and the network issue information is usable to indicate a network issue to be troubleshot by a second device, wherein the network issue information comprises at least one of a network issue identifier, a network issue scope, a network issue type, or a network issue name; and send the first information to the second device.

12. The apparatus according to claim 11, wherein the network issue information comprises the network issue type, and the first information further comprises at least one of the following information:

diagnosis indication information, usable to indicate a diagnosis of the network issue to be troubleshot;

recovery indication information, usable to indicate recovery of the network issue to be troubleshot; or query indication information, usable to indicate a query of the network issue to be troubleshot.

13. The apparatus according to claim 11, wherein the first information further comprises at least one of the following information:

a first duration, usable to indicate that another rectification is not allowed within the first duration in response to the network issue to be troubleshot being rectified; or a second duration, usable to indicate to verify, within the second duration, whether the network issue to be troubleshot is successfully rectified.

14. The apparatus according to claim 11, wherein the network issue information comprises more than one of the following: a network issue identifier, a network issue scope, a network issue type, or a network issue name.

15. The apparatus according to claim 11, wherein the network issue scope comprises at least one of the following:

a network element, usable to indicate that a network issue of the network element is a network issue to be troubleshot;

a cell, usable to indicate that a network issue of the cell is a network issue to be troubleshot;

a geographic region, usable to indicate that a network issue of the geographic region is a network issue to be troubleshot;

a tracking region, usable to indicate that a network issue of the tracking region is a network issue to be troubleshot;

a network issue type, usable to indicate that a network issue whose type is the network issue type is a network issue to be troubleshot; or a network issue name, usable to indicate that a network issue whose name is the network issue name is a network issue to be troubleshot.

16. An apparatus, comprising:

at least one processor; and a memory coupled to the at least one processor and having program instructions stored thereon which, when executed by the at least one processor, cause the apparatus to:

receive first information from a first device, wherein the first information comprises network issue information, and the network issue information is usable to indicate a network issue to be troubleshot, wherein the network issue information comprises at least one of a network issue identifier, a network issue scope, a network issue type, or a network issue name; and troubleshoot, based on the first information, the network issue to be troubleshot.

17. The apparatus according to claim 16, wherein the network issue information comprises the network issue type, and the first information further comprises at least one of the following information:

diagnosis indication information, usable to indicate a diagnosis of the network issue to be troubleshot;

recovery indication information, usable to indicate recovery of the network issue to be troubleshot; or query indication information, usable to indicate a query of the network issue to be troubleshot.

18. The apparatus according to claim 16, wherein the first information further comprises at least one of the following information:

a first duration, usable to indicate that another rectification is not allowed within the first duration in response to the network issue to be troubleshot being rectified; or a second duration, usable to indicate to verify, within the second duration, whether the network issue to be troubleshot is successfully rectified.

19. The apparatus according to claim 16, wherein the network issue information comprises more than one of the following: a network issue identifier, a network issue scope, a network issue type, or a network issue name.

20. The apparatus according to claim 16, wherein the network issue scope comprises at least one of the following:

a network element, usable to indicate that a network issue of the network element is a network issue to be troubleshot;

a cell, usable to indicate that a network issue of the cell is a network issue to be troubleshot;

a geographic region, usable to indicate that a network issue of the geographic region is a network issue to be troubleshot;

a tracking region, usable to indicate that a network issue of the tracking region is a network issue to be troubleshot;

a network issue type, usable to indicate that a network issue whose type is the network issue type is a network issue to be troubleshot; or a network issue name, usable to indicate that a network issue whose name is the network issue name is a network issue to be troubleshot.

* * * * *